United States Patent [19]

Almond et al.

[11] Patent Number: 4,480,696
[45] Date of Patent: Nov. 6, 1984

[54] FRACTURING METHOD FOR STIMULATION OF WELLS UTILIZING CARBON DIOXIDE BASED FLUIDS

[75] Inventors: Stephen W. Almond; Phillip C. Harris, both of Duncan, Okla.

[73] Assignee: Halliburton Company, Duncan, Okla.

[21] Appl. No.: 436,763

[22] Filed: Oct. 25, 1982

[51] Int. Cl.$^3$ ............................................. E21B 43/267
[52] U.S. Cl. ................ 166/308; 252/8.55 R; 166/280
[58] Field of Search ............... 166/308, 283, 281, 271; 252/8.55 R

[56] References Cited

U.S. PATENT DOCUMENTS

| | | | |
|---|---|---|---|
| 3,100,528 | 8/1963 | Plummer et al. | 166/308 |
| 3,108,636 | 10/1963 | Peterson | 166/308 |
| 3,195,634 | 7/1965 | Hill | 166/308 |
| 3,310,112 | 3/1967 | Nielsen | 166/308 |
| 3,368,627 | 2/1968 | Hurst et al. | 166/308 |
| 3,396,107 | 8/1968 | Hill | 252/8.55 |
| 3,448,044 | 6/1969 | Garrett | 210/704 |
| 3,640,344 | 2/1972 | Brandon | 166/307 |
| 3,664,422 | 5/1972 | Bullen | 166/283 |
| 3,710,865 | 1/1973 | Kiel | 166/308 |
| 3,722,595 | 3/1973 | Kiel | 166/308 |
| 3,765,488 | 10/1973 | Pence | 166/308 |
| 3,799,266 | 3/1974 | Kiel | 166/308 |
| 3,842,910 | 10/1974 | Zingg et al. | 166/305 R |
| 3,937,283 | 2/1976 | Blauer | 166/307 |
| 3,954,626 | 5/1976 | Greminger et al. | 252/8.55 R |
| 3,954,636 | 5/1976 | Crowe et al. | 252/8.55 R |
| 3,980,136 | 9/1976 | Plummer et al. | 166/280 |
| 4,156,464 | 5/1979 | Hussin | 166/308 |
| 4,212,354 | 7/1980 | Guinn | 166/303 |
| 4,267,887 | 5/1981 | Watanabe | 166/300 |

*Primary Examiner*—Stephen J. Novosad
*Assistant Examiner*—Mark J. Del Signore
*Attorney, Agent, or Firm*—Robert A. Kent; Thomas R. Weaver

[57] ABSTRACT

A method of fracturing a subterranean formation with a stabilized foamed fracturing fluid comprising from about 50 percent to in excess of about 96 percent by volume of carbon dioxide with the remainder comprising an aqueous liquid and a selected surfactant. The foam is formed in situ by injection of a stabilized liquid-liquid emulsion containing liquid carbon dioxide into a well bore penetrating the formation. The temperature and pressure of the emulsion is controlled to maintain the carbon dioxide in the liquid phase during injection into the well bore. Thereafter, the carbon dioxide is heated by the subterranean formation to a temperature above about 88° F. at which time the stabilized emulsion spontaneously forms a high quality stabilized foam.

18 Claims, No Drawings

4,480,696

FRACTURING METHOD FOR STIMULATION OF WELLS UTILIZING CARBON DIOXIDE BASED FLUIDS

BACKGROUND OF THE INVENTION

1. Field of the Invention

This invention relates to a method of fracturing subterranean formations penetrated by a well bore utilizing carbon dioxide based fluids. More particularly, this invention relates to a method of fracturing a subterranean formation with a two-phase fluid.

2. Description of the Prior Art

The treatment of subterranean formations penetrated by a well bore to stimulate the production of hydrocarbons therefrom or the ability of the formation to accept injected fluids has long been known in the art. One of the most common methods of increasing productivity of a hydrocarbon-bearing formation is to subject the formation to a fracturing treatment. This treatment is effected by injecting a liquid, gas or two-phase fluid which generally is referred to as a fracturing fluid down the well bore at sufficient pressure and flow rate to fracture the subterranean formation. A proppant material such as sand, fine gravel, sintered bauxite, glass beads or the like can be introduced into the fractures to keep them open. The propped fracture provides larger flow channels through which an increased quantity of a hydrocarbon can flow, thereby increasing the productive capability of a well.

A traditional fracturing technique utilizes a water or oil-based fluid to fracture a hydrocarbon-bearing formation.

Another successful fracturing technique has been that known as "foam fracturing". This process is described in, for example, U.S. Pat. No. 3,980,136. Briefly, that process involves generation of a foam of a desired "Mitchell quality" which then is introduced through a well bore into a formation which is to be fractured. The composition of the foam is such that the Mitchell foam quality at the bottom of the well is in the range of from about 0.53 to 0.99. Various gases and liquids can be used to create the foam, but foams generally used in the art are made from nitrogen and water, in the presence of a suitable surfactant. the pressure at which the foam is pumped into the well is such that it will cause a fracture of the hydrocarbon-bearing formation. Additionally, the foam comes out of the well easily when the pressure is released from the well head, because the foam expands when the pressure is reduced.

Yet another fracturing technique has been that utilizing a liquified, normally gaseous fluid. U.S. Pat. No. 3,195,634, for example, discloses a method for treating a subterranean formation penetrated by a well bore with a composition comprising a liquid-liquid mixture of carbon dioxide and water. The carbon dioxide is present in an amount equivalent to from about 300 to about 1500 SCF at 80° F. and 14.7 psia per 42 gallons of water. The composition is injected into the formation under sufficient pressure to fracture the formation. The composition can include gelling agents and proppant materials. Upon pressure release at the well head, the liquid carbon dioxide vaporizes and flows from the formation.

U.S. Pat. No. 3,310,112 discloses a method of fracturing a subterranean formation penetrated by a well bore comprising introduction of a mixture of liquid carbon dioxide and a propping agent slurried in a suitable vehicle into the well bore at a pressure sufficient to fracture the formation. The liquid carbon dioxide is present in an amount sufficient to provide at least five volumes of carbon dioxide per volume of slurried propping agent. After injection of the liquid carbon dioxide containing the propping agent, the pressure on the well bore is released. The liquid carbon dioxide normally is heated sufficiently by the formation that upon pressure release, the liquid changes to a gas. A substantial portion of the carbon dioxide then leaves the well and forces or carries out with it an appreciable amount of the oil or aqueous vehicle utilized to transport the proppant.

U.S. Pat. No. 3,368,627 discloses a method of treating a formation penetrated by a well bore which consists essentially of injecting down the well bore a fluid azeotropic mixture which has a critical temperature sufficiently high or a critical pressure sufficiently low to remain a liquid at the temperature and pressure existing during injection and treatment of the formation. The fluid mixture has critical properties such that a substantial portion of the injected fluid is converted to a gas upon a release of the pressure applied to the liquid during injection into the formation. The fluid mixture consists essentially of carbon dioxide and at least one $C_2$ to $C_6$ hydrocarbon.

U.S. Pat. No. 3,664,422 discloses a method of treating a subsurface earth formation penetrated by a well bore comprising injection of a liquified gas together with a gelled alcohol into the formation at a pressure sufficient to fracture the formation. The liquified gas is returned from the formation by vaporization following pressure reduction on the well bore. The gelled alcohol is removed by vaporization during subsequent production from the well leaving only the broken gelling agent in the formation.

It would be desirable to provide a method by which a viscous fluid can be created from carbon dioxide and an aqueous fluid which is stable over a broad temperature range and is capable of carrying high concentrations of proppant into a subterranean formation.

SUMMARY OF THE INVENTION

The present invention relates to a method and fluids for forming fractures in subterranean formations penetrated by a well bore and transporting increased concentrations of proppant material into the formation penetrated by the well bore. The method and fluids permit increased penetration of the formation by the fluids together with low fluid leak-off to the formation and the ability to carry high concentrations of proppant material without proppant settling in the fracturing fluids. The fracturing fluids of the invention are stabilized liquid-liquid emulsions of liquified carbon dioxide and an aqueous fluid at surface conditions, and the emulsion is converted into a gas-in-liquid foam upon heating in the formation to a temperature above the critical temperature of the carbon dioxide. The fracturing fluids comprise from about 50 to in excess of 96 percent by volume carbon dioxide. The fracturing fluid contains a surfactant which stabilizes the emulsion and foam which is produced against breakdown and can include gelling agents for additional stability, proppant material and the like.

The emulsions and foams produced by the method of the present invention are characterized by a high quality, that is, the ratio of the carbon dioxide volume to the volume of the carbon dioxide and aqueous liquids in the fluid is very high and the emulsions and foams have a viscosity sufficient to transport siginificant concentrations of proppant material. The emulsion which is formed by practice of the present method has a very fine cell size distribution or texture which is sufficiently stable to support proppant material in concentrations up to a level in excess of about 15 pounds per gallon of emulsion.

DESCRIPTION OF THE PREFERRED EMBODIMENT

In the practice of the present invention, a fracturing fluid is prepared by admixing, under suitable conditions of temperature and pressure, a quantity of liquified carbon dioxide with an aqueous liquid and a surfactant to form a stabilized liquid-liquid emulsion.

The liquified carbon dioxide is provided from a surface vessel at a temperature and pressure sufficient to maintain the liquid conditions of the normally gaseous carbon dioxide, such as for example, a temperature of about 0° F. and a pressure of about 300 psia. The liquid carbon dioxide is admixed with the aqueous fluid in an amount sufficient to provide a volumetric ratio of liquid carbon dioxide to aqueous fluid in the range of from about 1:1 to about 20:1. Preferably, the ratio is in the range of from about 2:1 to about 18:1. The foam formed from the emulsion will have a quality of from about 50 percent to in excess of about 96 percent. The term "quality" as used herein is intended to mean the percentage of the volume of carbon dioxide at the existing temperature and pressure within the formation to the volume of the carbon dioxide plus the volume of the aqueous fluid and any other liquid components present in the fracturing fluid.

The aqueous liquid can comprise any aqueous solution which does not adversely react with the constituents of the fracturing fluid, the subterranean formation or the hydrocarbons present therein. The aqueous liquid can comprise, for example, water, a potassium chloride solution, water-alcohol mixtures or the like.

The liquid carbon dioxide and aqueous liquid can be admixed in a pressurized mixer or other suitable apparatus. In one preferred embodiment, the carbon dioxide and aqueous liquid are admixed by turbulent contact at a simple "T" connection in the fracturing fluid injection pipeline to form the emulsion. The emulsion will have a temperature below about the critical temperature of the carbon dioxide. The liquid-liquid emulsion is stabilized by the addition of a quantity of a selected surfactant. The surfactant comprises cationic, anionic or nonionic compounds, such as for example, betaines, sulfated alkoxylates, alkyl quaternary amines or ethoxylated linear alcohols. The particular surfactant employed will depend upon the type of formation which is to be fractured. The surfactant is admixed with the emulsion in an amount of from about one-half to about 20 gallons per 1000 gallons of emulsion to provide a surfactant concentration of from about 0.05 percent to about 2.0 percent by weight. It is to be understood that larger quantities of the designated surfactants can be employed, however, such use is uneconomical. The surfactant, preferably, is admixed with the aqueous liquid prior to formation of the emulsion to facilitate uniform admixing.

The stabilized emulsion which is formed is characterized by a very fine cell size distribution or texture. The term "cell size" as used herein means the size of the gaseous or liquid carbon dioxide droplet which is surrounded by the aqueous fluid in the emulsion. The term "texture" as used herein means the general appearance of the distributed cells of gaseous or liquid carbon dioxide in the emulsion. The fine texture of the emulsion of the present invention permits the transport of high concentrations of proppant material. The fine texture of the emulsion also results in the formation of a foam having a smaller cell size than otherwise would be possible such as by conventional foam generation methods in which the foam is generated on the surface and pumped into the subterranean formation.

In one preferred embodiment, a gelling agent is admixed with the aqueous liquid prior to formation of the emulsion. The gelling agent can comprise, for example hydratable polymers which contain, in sufficient concentration and reactive position, one or more of the functional groups, such as, hydroxyl, cis-hydroxyl, carboxyl, sulfate, sulfonate, amino or amide. Particularly sutiable such polymers are polysaccharides and derivatives thereof which contain one or more of the following monosaccharide units: galactose, mannose, glucoside, glucose, xylose, arabinose, fructose, glucuronic acid or pyranosyl sulfate. Natural hydratable polymers containing the foregoing functional groups and units include guar gum and derivatives thereof, locust bean gum, tara, konjak, tamarind, starch, cellulose and derivatives thereof, karaya, xanthan, tragacanth and carrageenan.

Hydratable synthetic polymers and copolymers which contain the above-mentioned functional groups and which can be utilized in accordance with the present invention include, but are not limited to, polyacrylate, polymethacrylate, polyacrylamide, maleic anhydride methylvinyl ether copolymers, polyvinyl alcohol, and polyvinylpyrrolidone.

Various compounds can be utilized with the above-mentioned hydratable polymers in an aqueous solution to inhibit or retard the hydration rate of the polymers, and therefore, delay a viscosity increase in the solution for a required period of time. Depending upon the particular functional groups contained in the polymer, different inhibitors react with the functional groups to inhibit hydration. For example, inhibitors for cis-hydroxyl functional groups include compounds containing multivalent metals which are capable of releasing the metal ions in an aqueous solution, borates, silicates, and aldehydes. Examples of the multivalent metal ions are chrominum, zirconium, antimony, titanium, iron (ferrous or ferric), tin, zinc and aluminum. Inhibitors for hydroxyl functional groups include mono- and di-functional aldehydes containing from about 1 to about 5 carbon atoms and multivalent metal salts that form hydroxide. Multivalent metal salts or compounds can be utilized as inhibitors for the hydroxyl functional groups. Inhibitors for amides include aldehydes and multivalent metal salts or compounds. Generally, any compound can be used as an inhibitor for a hydratable polymer if the compound reacts or otherwise combines with the polymer to cross-link, form a complex or otherwise tie-up the functional groups of the polymer whereby the rate of hydration of the polymer is retarded.

As stated above, the functional groups contained in the polymer or polymers utilized must be in sufficient concentration and in a reactive position in interact with the inhibitors. Preferred hydratable polymers which yield high viscosities upon hydration, that is, apparent viscosities in the range of from about 10 centipoise to about 90 centipoise at a concentration in the range of from about 10 lbs/1000 gals. to about 80 lbs/1000 gals.

in water, are guar gum and guar derivatives such as hydroxypropyl guar and carboxymethylguar, cellulose derivatives such as hydroxyethylcellulose, carboxymethylcellulose, and carboxymethyl-hydroxyethylcellulose, locust bean gum, carrageenan gum and xanthan gum. Xanthan gum is a biopolysaccharide produced by the action of bacteria of the genus Xanthonomas. The hydration of the polymers can be inhibited or retarded by various inhibitors present in the aqueous liquid. The reversal of the inhibition of such polymers by the inhibitors can be accomplished by a change in the pH of the solution or by heating the solution to an appropriate temperature, generally above about 140° F.

Examples of some of the inhibitors which can be utilized depending upon the particular polymer or polymers used in the aqueous liquid are sodium sulfite-sodium dichromate, aluminum sulfate, titanium triethanolamine chelate, basic potassium pyroantimonate, zinc chloride, iron chloride, tin chloride, zirconium oxychloride in hydrochloric acid solution, sodium tetraborate and glyoxal. The gelled aqueous liquid thus formed can be used to transport significant quantities of proppant material to the point of mixing with the carbon dioxide. The proppant material can comprise, for example, sand, graded gravel, glass beads, sintered bauxite, resin-coated sand or the like.

The proppant material is admixed with the gelled aqueous liquid prior to admixing with the liquid carbon dioxide. The admixing of the proppant material with the gelled liquid can be effected in any suitable mixing apparatus, such as for example, a batch mixer or the like.

The amount of proppant material admixed with the gelled aqueous liquid may be varied to provide the desired amount of proppant in the two-phase fluid introduced into the formation. The proppant material can be admixed with the aqueous liquid in an amount of from about zero pounds of proppant per gallon of aqueous liquid up to as many pounds of proppant material per gallon as may be pumped. Depending upon formation reservoir conditions, the amount of proppant material transported by the two-phase fluid within the subterranean formation generally can be in the range of from about $\frac{1}{2}$ pound to about 15 pounds per gallon of two-phase fracturing fluid without a screen out occurring.

The fracturing fluid of the present invention is introduced into the well bore which penetrates the subterranean formation to be treated at a temperature below the critical temperature of the carbon dioxide and at a pressure above the critical pressure of the carbon dioxide. The initial viscosity of the liquid-liquid emulsion comprising the fracturing fluid is such that the fluid is easily pumped through the well bore, however, the viscosity of the fluid still is sufficient to support a significant quantity of proppant material.

As the fracturing fluid is introduced into the subterranean formation, the fluid slowly is heated to a temperature above the critical temperature of the carbon dioxide. Surprisingly, it has been found that when the stabilized liquid-liquid emulsion is heated to a temperature above the critical temperature of the carbon dioxide, the fluid maintains its viscosity and undergoes conversion into a foam. The foam as well as the emulsion is stabilized by the presence of the surfactant and the gelling agent present in the fracturing fluid. As the liquid carbon dioxide undergoes conversion to a gas, a slight increase in the volume of the carbon dioxide is found to occur. The term "gas" as used herein means a fluid at a temperature equal to or above the critical temperature of the fluid while maintained at any given pressure. Upon conversion of the stabilized liquid-liquid emulsion of the present invention to a foam, the foam is found to be substantially stabilized and it continues to transport the proppant material into the fracture formed in the subterranean formation by the foamed fracturing fluid with at least substantially the same effectiveness as a gelled liquid. The foam has been found to have a viscosity immediately after formation which is substantially the same as the viscosity of the liquid-liquid emulsion. Further, the foam substantially reduces any fluid leak-off to the formation that otherwise would occur is only a liquid fracturing fluid was utilized to treat the formation. The low fluid-loss characteristics of the fracturing fluid of the present invention results in a greater volumetric efficiency for a given volume and injection rate of the fracturing fluid in comparison to liquid fracturing fluids.

After the introduction of the full amount of the calculated or estimated volume of fracturing fluid necessary to fracture the formation and transport the proppant material, the well bore is shut-in for a period of time sufficient to permit stabilization of the subterranean formation. In one embodiment, the well is shut-in for a period of time to permit the formation to at least partially close upon the proppant material and stabilize the fracture volume. The shut-in period can be from several minutes to in excess of about 12 hours and, preferably, is in the range of from about 1 to 2 hours. After the subterranean formation has stabilized, the well is opened under controlled conditions and the pressure drop in the well bore causes the foam to break. The carbon dioxide gas then moves from the formation into the well bore and exits the well bore at the surface. The gas carries from the formation substantially all of the liquids present in the fracturing area which leaves the formation and well clean and ready for the commencement of production.

To further illustrate the method of the present invention, and not by way of limitation, the following examples are provided.

EXAMPLE I

To illustrate the stability of the liquid-liquid emulsion, the following tests were performed. To 15 milliliters of aqueous fluid in a pressure vessel, 45 milliliters of liquid carbon dioxide is added to form a mixture. The mixture is maintained at a temperature of about 75° F. and a pressure of about 900 psig by nitrogen gas. This mixture is stirred for approximately one minute at 1,000 rpm. The time required for the liquid-liquid emulsion to separate into two layers then is determined. The time required for the separation to occur provides a relative indication of the stability of emulsion.

In the first test, the aqueous fluid in the emulsion comprised water. The emulsion separated into two clear layers in about six seconds.

In the second test, the aqueous fluid comprised a hydrated gelling agent in a ratio of 20 lb. of guar gum per 1,000 gallons of water. The liquid-liquid mixture formed an emulsion which rapidly dissipated to form a cloudy liquid which did not separate further after fifteen minutes.

In the third test, in accordance with the present invention, the aqueous fluid comprised water and a surfactant comprising an ammonium salt of a sulfated linear $C_{12}$ to $C_{14}$ alcohol ethoxylated with 3 moles of ethylene oxide in a ratio of 5 gallons surfactant per 1,000 gallons of water. The liquid-liquid mixture formed a fine textured emulsion together with some foam from the apparent entrainment of nitrogen gas utilized to provide the overpressure to maintain the 900 psig pressure. The emulsion and foam had a volume of about 90 milliliters and after 15 minutes has a volume of over about 80 milliliters.

In the fourth test a gelling agent comprising guar gum was added to a mixture comprising the same composition as the third test in a ratio of 20 lb. per 1,000 gallons of water. The liquid-liquid mixture formed a fine textured emulsion together with some foam. The emulsion and foam had a volume of over about 90 milliliters and, after 15 minutes, no apparent separation or reduction in volume occurred.

These tests clearly illustrate the substantial stability of the emulsion formed in accordance with the practice of the present invention. The stability of the foam formed in the tests also is an indication that the foam formed upon heating the carbon dioxide to a temperature above its critical temperature in the subterranean formation will have substantial stability.

EXAMPLE II

A fracturing treatment is performed on a well in the Cotton Valley Sand Formation in Louisiana. The well is perforated at a level of about 6,900 feet. The formation has a permeability of about 1.0 millidarcy and a porosity of about 16 percent. The bottom hole temperature is about 200° F. The treatment was effected by pumping the fracturing fluid through a 2⅞ inch tubing string positioned in the well bore.

A prepad of 4,000 gallons of two percent potassium chloride water gelled with 40 pounds of hydroxypropylguar per 1,000 gallons of water is introduced into the formation. The potassium chloride is used as a water treating agent to prevent clay swelling in the formation. A pad of 10,000 gallons of a liquid-liquid emulsion then is introduced into the tubing. The emulsion comprises 70 percent by volume liquid carbon dioxide with the remainder being two percent potassium chloride water together with 40 pounds of hydroxypropylguar and six gallons of an anionic surfactant per 1,000 gallons of water. The surfactant comprises an ammonium salt of a sulfated linear $C_{12}$ to $C_{14}$ alcohol ethoxylated with 3 moles of ethylene oxide. Fracturing fluid having the same composition as the pad fluid then is introduced into the tubing together with increasing quantities of a proppant comprising 20/40 mesh sand. A total of 20,000 gallons of emulsion is introduced into the tubing with a sand concentration increasing in four generally equal stages from 1 pound per gallon of emulsion to 4 pounds per gallon. This concentration is achieved by admixing the sand with the gelled 2 percent potassium chloride water in a blender and subsequently admixing the gelled fluid with the liquid carbon dioxide by passage through a "T" connector in the injection pipeline connected to the 2⅞-inch tubing string. Thereafter, the tubing is flushed with sufficient gelled 2 percent potassium chloride water similar to the prepad to force the fracturing fluid into the formation.

The emulsion was introduced into the tubing at a rate of about 15 barrels per minute.

The well is shut-in for about 1 to 2 hours, after which it was vented to atmospheric pressure under controlled conditions. The gaseous carbon dioxide is allowed to flow out of the well and in excess of about 80 percent of the water introduced into the formation is returned with the carbon dioxide.

The well prior to the treatment in accordance with the present invention, was producing approximately two barrels of oil per day. After treatment, the well produced in excess of forty barrels of oil per day and after five months is still producing in excess of 30 barrels of oil per day.

EXAMPLE III

A fracturing treatment is performed on a well in the Mancos Formation in Colorado. The well is perforated at a level of about 10,800 feet. The formation has a permeability of about 0.0005 millidarcy. The bottom hole temperature is about 250° F. The treating is effected by pumping the fluids down the annulus between 2⅞-inch and 7-inch tubing positioned in the well bore.

A pad comprising a liquid-liquid emulsion comprising 70 percent by volume liquid carbon dioxide with the remainder comprising 2 percent potassium chloride water gelled with 40 pounds of hydroxpropylguar and stabilized with 8 gallons of the surfactant of Example I per 1,000 gallons of water. The fracturing fluid has the same composition as the pad fluid except that a proppant is admixed with the gelled water prior to formation of the liquid-liquid emulsion. The fracturing fluid is cleaned from the well bore with a flush fluid. The flush has the same composition as the pad fluid. The sequence of the fluids and the proppant concentrations are as indicated in the following Table. The proppant comprises sand of either 70/100 mesh or 20/40 mesh on the U.S. Sieve Series.

TABLE

| Fluid | Volume, (M Gallon) | Rate of Pumping, (BPM) | Typical Annulus Pressure, (PSI) | Proppant Concentration (Lb/Gal) | Proppant Size |
|---|---|---|---|---|---|
| PAD | 30 | 48 | 4070 | — | — |
| Frac Fluid | 10 | 47 | 5110 | 1.5 | 70/170 |
| PAD | 20 | 48 | 4900 | — | — |
| Frac Fluid | 20 | 48 | 5140 | 1 | 20/40 |
| Frac Fluid | 20 | 48 | 5210 | 2 | 20/40 |
| Frac Fluid | 30 | 47 | 5360 | 3 | 20/40 |
| Frac Fluid | 30 | 42 | 5150 | 4 | 20/40 |
| Frac Fluid | 40 | 42 | 5320 | 5 | 20/40 |
| Frac Fluid | 13[1] | 38 | 4950 | 6 | 20/40 |
| Frac Fluid | 13[1] | 38 | 5040 | 7 | 20/40 |
| Flush | 13[1] | 38 | 4310 | — | — |

[1]The liquid carbon dioxide is reduced from 70 percent to 67 percent by volume of the fluid.

The method of the present invention is capable of placing proppant into a formation at a concentration of in excess of 7 pounds per gallon of foam formed in the formation upon conversion of the liquid-liquid emulsion. Following the treatment, the well is shut-in for about 3 hours after which it is vented to the atmosphere. The gaseous carbon dioxide is allowed to flow from the formation and approximately 85 percent of the water introduced into the formation is returned within three days with the carbon dioxide.

Prior to the described treatment, the well was producing less than about 50 MCF of gas per day; and about a month after the treatment, the well stabilized at about 450 MCF of gas per day.

The terms "stable" or "stabilized" as used herein with regard to the emulsions and foams of the present invention means the physical and functional properties of the fluid remain substantially unchanged for a period of time sufficient to permit the described formation treatment to be effected.

While preferred embodiments of the invention have been described herein, changes or modifications in the method may be made by an individual skilled in the art, without departing from the spirit or scope of the invention as set forth in the appended claims.

What is claimed is:

1. A method of fracturing a subterranean formation penetrated by a well bore comprising:
   admixing an aqueous liquid with liquid carbon dioxide and a selected surfactant comprising at least one member selected from the group consisting of alkyl quaternary amines, betaines, sulfated alkoxylates and ethoxylated linear alcohols to form a stabilized emulsion, said emulsion comprising from about 50 to in excess of about 96 percent by volume carbon dioxide and said surfactant being present in said emulsion in an amount sufficient to stabilize said emulsion;
   introducing said emulsion into said well bore penetrating said subterranean formation at a temperature below the critical temperature of carbon dioxide and under sufficient pressure to maintain the carbon dioxide as a liquid;
   maintaining said emulsion within said formation for a sufficient time to permit said emulsion to be heated to a temperature above the critical temperature of carbon dioxide to form a stabilized foam from said emulsion, said foam having a viscosity immediately after formation which is substantially the same as the viscosity of the emulsion; and
   fracturing said subterranean formation with said foam.

2. The method of claim 1 wherein said surfactant is present in a concentration in the range of from about 0.05 percent to about 2.0 percent by weight of the emulsion.

3. The method of claim 1 wherein said emulsion contains a gelling agent comprising a hydratable polymer.

4. A method of claim 1 wherein said emulsion contains a proppant material.

5. The method of claim 4 wherein said proppant is present in an amount of from about 0.5 pound to about 15 pounds per gallon of emulsion.

6. The method of claim 1 wherein said emulsion contains a gelling agent comprising a hydratable polymer in an amount of from about 10 pounds to about 80 pounds per 1,000 gallons of aqueous liquid.

7. A method of fracturing a subterranean formation penetrated by a well bore comprising:
   admixing an aqueous liquid with a proppant material, liquid carbon dioxide and a selected surfactant comprising at least one member selected from the group consisting of alkyl quaternary amines, betaines, sulfated alkoxylates and ethoxylated linear alcohols to form a stabilized emulsion, said emulsion comprising from about 50 to in excess of about 96 percent by volume carbon dioxide and said surfactant being present in said emulsion in an amount sufficient to stabilize said emulsion;
   introducing said stabilized emulsion into said well bore penetrating said subterranean formation at a temperature below the critical temperature of carbon dioxide and under sufficient pressure to maintain the carbon dioxide as a liquid;
   maintaining said stabilized emulsion within said formation for a sufficient time to permit said emulsion to be heated to a temperature above the critical temperature of carbon dioxide to form a stabilized foam from said emulsion, said foam having a viscosity immediately after formation which is substantially the same as the viscosity of the emulsion;
   contacting said formation with said foam at a pressure sufficient to create at least one fracture in said subterranean formation; and
   depositing said proppant material in said fracture in said subterranean formation.

8. The method of claim 7 wherein said surfactant is present in a concentration in the range of from about 0.05 percent to about 2.0 percent by weight of the emulsion.

9. The method of claim 7 wherein said emulsion contains a gelling agent comprising a hydratable polymer.

10. The method of claim 7 wherein said proppant is present in an amount of from about 0.5 pound to about 15 pounds per gallon of emulsion.

11. The method of claim 7 wherein said emulsion contains a gelling agent comprising a hydratable polymer in an amount of from about 10 pounds to about 80 pounds per 1,000 gallons of aqueous liquid.

12. A method of fracturing a subterranean formation penetrated by a well bore comprising:
   admixing an aqueous liquid and a gelling agent with liquid carbon dioxide and a selected surfactant to form a stabilized emulsion, said emulsion comprising from about 50 to in excess of about 96 percent by volume carbon dioxide and said surfactant being present in said emulsion in an amount sufficient to stabilize said emulsion and said gelling agent comprising a hydratable polymer present in an amount of from about 10 pounds to about 80 pounds per 1000 gallons of aqueous liquid and an inhibitor to retard the hydration rate of the hydratable polymer;
   introducing said emulsion into said well bore penetrating said subterranean formation at a temperature below the critical temperature of carbon dioxide and under sufficient pressure to maintain the carbon dioxide as a liquid;
   maintaining said emulsion within said formation for a sufficient time to permit said emulsion to be heated to a temperature above the critical temperature of carbon dioxide to form a stabilized foam from said emulsion, said foam having a viscosity immediately after formation which is substantially the same as the viscosity of the emulsion; and
   fracturing said subterranean formation with said foam.

13. The method of claim 12 wherein said surfactant comprises at least one member selected from the group consisting of alkyl quaternary amines, betaines, sulfated alkoxylates and ethyoxylated linear alcohols.

14. The method of claim 12 wherein said surfactant is present in a concentration in the range of from about 0.05 percent to about 2.0 percent by weight of the emulsion.

15. A method of fracturing a subterranean formation penetrated by a well bore comprising:
   admixing an aqueous liquid and a gelling agent comprising a hydratable polymer and an inhibitor to retard the hydration rate of said hydratable polymer with a proppant material, liquid carbon dioxide and a selected surfactant to form a stabilized emulsion, said emulsion comprising from about 50 to in excess of about 96 percent by volume carbon dioxide, said surfactant being present in said emulsion in an amount sufficient to stabilize said emulsion and said gelling agent being present in an amount of from about 10 pounds to about 80 pounds per 1000 gallons of aqueous liquid;

introducing said stabilized emulsion into said well bore penetrating said subterranean formation at a temperature below the critical temperature of carbon dioxide and under sufficient pressure to maintain the carbon dioxide as a liquid;

maintaining said stabilized emulsion within said formation for a sufficient time to permit said emulsion to be heated to a temperature above the critical temperature of carbon dioxide to form a stabilized foam from said emulsion, said foam having a viscosity immediately after formation which is substantially the same as the viscosity of the emulsion;

contacting said formation with said foam at a pressure sufficient to create at least one fracture in said subterranean formation; and depositing said proppant material in said fracture in said subterranean formation.

16. The method of claim 15 wherein said surfactant comprises at least one member selected from the group consisting of alkyl quaternary amines, betaines, sulfated alkoxylates and ethyoxylated linear alcohols.

17. The method of claim 15 wherein said surfactant is present in a concentration in the range of from about 0.05 percent to about 2.0 percent by weight of the emulsion.

18. The method of claim 15 wherein said proppant is present in an amount of from about 0.5 pound to about 15 pounds per gallon of emulsion.

* * * * *